(12) United States Patent
Aalderink

(10) Patent No.: US 9,156,324 B2
(45) Date of Patent: Oct. 13, 2015

(54) VEHICLE AXLE SUSPENSION, AND VEHICLE COMPRISING SUCH VEHICLE AXLE SUSPENSION

(75) Inventor: Derk Geert Aalderink, Laren (NL)

(73) Assignee: VDL Weweler B.V., Apeldoorn (NL)

( * ) Notice: Subject to any disclaimer, the term of this patent is extended or adjusted under 35 U.S.C. 154(b) by 0 days.

(21) Appl. No.: 13/992,559

(22) PCT Filed: Dec. 9, 2010

(86) PCT No.: PCT/NL2010/050835
§ 371 (c)(1),
(2), (4) Date: Mar. 21, 2014

(87) PCT Pub. No.: WO2012/078031
PCT Pub. Date: Jun. 14, 2012

(65) Prior Publication Data
US 2014/0197613 A1 Jul. 17, 2014

(51) Int. Cl.
*B60G 9/00* (2006.01)
*B60G 7/00* (2006.01)
(Continued)

(52) U.S. Cl.
CPC ............... *B60G 9/003* (2013.01); *B60G 7/001* (2013.01); *B60G 7/008* (2013.01); *B60G 11/113* (2013.01);
(Continued)

(58) Field of Classification Search
CPC ............. B60G 2204/4306; B60G 2204/43065; B60G 2204/148; B60G 9/003; B60G 9/00; B60G 11/27; B60G 2200/31; B60G 2202/152; B60G 7/008; B60G 11/465; B60G 7/001; B60G 11/113
USPC .................................................. 280/124.116
See application file for complete search history.

(56) References Cited

U.S. PATENT DOCUMENTS 1,422,956 A * 7/1922 Gaar ............................... 267/52
2,929,617 A * 3/1960 Gray et al. ....................... 267/2
(Continued)

FOREIGN PATENT DOCUMENTS

DE 296 15 286 U1 11/1996
DE 296 16 351 U1 1/1997
(Continued)

OTHER PUBLICATIONS

International Search Report for PCT Application No. PCT/NL2010/050835, European Patent Office, mailing date Jun. 17, 2011, 13 pages.

*Primary Examiner* — Paul N Dickson
*Assistant Examiner* — Timothy Wilhelm
(74) *Attorney, Agent, or Firm* — Sterne, Kessler, Goldstein & Fox P.L.L.C.

(57) ABSTRACT

The invention relates to a vehicle axle suspension comprising: —a tubular axle body (3) having a longitudinal axis; —resilient suspension arms (5) which extend in the longitudinal direction of the vehicle on both sides of the vehicle, and which cross the axle body substantially perpendicular, each suspension arm having a curved portion (9) with a concave underside forming an axle recess in which the axle body is received, and each suspension arm being hingedly connectable at the front, viewed in the direction of travel of the vehicle, to a bearing bracket arranged on the vehicle chassis; —two intermediate members (13), each intermediate member being positioned in said axle recess between the axle body and the curved portion of one of the respective suspension arms, wherein each intermediate member has a concave underside which matches with the outer contour of the tubular axle body; —a pneumatic spring for each suspension arm which is operational between the respective suspension arm and the vehicle chassis; —a clamping assembly (17, 18, 19) associated with each suspension arm, wherein the axle body, the respective intermediate member and the suspension arm are retained solely by the clamping assembly.

6 Claims, 3 Drawing Sheets

(51) Int. Cl.
*B60G 11/113* (2006.01)
*B60G 11/46* (2006.01)

(52) U.S. Cl.
CPC .......... *B60G 11/465* (2013.01); *B60G 2200/31* (2013.01); *B60G 2204/148* (2013.01); *B60G 2204/42* (2013.01); *B60G 2204/4306* (2013.01); *B60G 2204/44* (2013.01)

(56) References Cited

U.S. PATENT DOCUMENTS

| | | | | |
|---|---|---|---|---|
| 4,519,591 | A | * | 5/1985 | Bush et al. .................... 267/148 |
| 4,858,949 | A | * | 8/1989 | Wallace et al. ........ 280/124.116 |
| 5,346,247 | A | * | 9/1994 | Snyder ................... 280/124.116 |
| 5,427,404 | A | * | 6/1995 | Stephens ................ 280/124.162 |
| 5,634,655 | A | * | 6/1997 | Chalin ................... 280/124.165 |
| 6,082,750 | A | * | 7/2000 | Merkler et al. ........ 280/124.175 |
| 6,641,156 | B1 | * | 11/2003 | Barlas et al. ........... 280/124.175 |
| 8,226,099 | B2 | * | 7/2012 | Koschinat .............. 280/124.116 |
| 8,317,209 | B2 | * | 11/2012 | Aalderink et al. ..... 280/124.116 |
| 8,827,289 | B2 | * | 9/2014 | Dilworth et al. ....... 280/124.111 |

FOREIGN PATENT DOCUMENTS

| | | |
|---|---|---|
| DE | 199 46 802 A1 | 4/2001 |
| EP | 1 273 464 A1 | 1/2003 |
| EP | 1 334 848 A1 | 8/2003 |
| EP | 1 508 459 A1 | 2/2005 |
| EP | 1 580 044 A1 | 9/2005 |
| EP | 2 130 688 A1 | 12/2009 |
| WO | WO 2008/046488 A2 | 4/2008 |
| WO | WO 2009/014423 A1 | 1/2009 |

* cited by examiner

VEHICLE AXLE SUSPENSION, AND VEHICLE COMPRISING SUCH VEHICLE AXLE SUSPENSION

The invention relates to a vehicle axle suspension for a vehicle such as a lorry or a trailer.

Vehicle axle suspensions typically comprise a tubular axle body extending in a direction perpendicular to the longitudinal direction of the vehicle. Wheels are then attached to the outer ends of the axle body. During driving of the vehicle, the axle body is susceptible to up-down movements and roll movements.

In order to cope with these movements, the axle body is mounted to a vehicle chassis via two resilient suspension arms arranged on both sides of the vehicle and extending in the longitudinal direction of the vehicle. Said suspension arm has a resilient structure so as to flex elastically under load during driving with the vehicle.

Each suspension arm crosses the axle body substantially perpendicular and has a curved portion at the location of the axle body to receive the axle body at the concave underside of the curved portion of the suspension arm. Each suspension arm is hingedly connected at the front, viewed in the direction of travel of the vehicle, to a bearing bracket arranged on the vehicle chassis, and a clamping assembly is provided to retain each suspension arm and axle body by clamping.

Furthermore, pneumatic springs are present which are operational between each of the trailing arms and the vehicle chassis. As a result, the pneumatic springs mainly counteract up-down movement and the resilient suspension arms mainly counteract roll movement of the axle body.

In order to clamp the suspension arm and axle body together without undesirably deforming the tubular axle body, it is known to provide an intermediate member between the axle body and the curved portion of a suspension arm. The intermediate member is used to spread, preferably evenly spread, the clamping forces over a certain clamping angle, e.g. about 180 degrees or more, relative to the axle body about the centre of the axle body, thereby preventing the axle body from undesirable deformation due to high local forces/loads.

It has been found that the spreading of the clamping forces due to the intermediate members is not always satisfactory and may be substantially limited to an angle smaller than the intended clamping angle, for example the clamping angle does not extend all the way to the outer ends of the intermediate member. As a result, the axle body may still be undesirably deformed due to the clamping forces and/or the amount of wear between axle body and intermediate member and/or between intermediate member and suspension arm is increased.

It is therefore an object of the invention to provide a vehicle axle suspension having improved clamping performance in particular with a reduced chance of deformation of the axle body.

This object is achieved by a vehicle axle suspension comprising:
- a tubular, preferably cylindrical, axle body having a longitudinal axis;
- resilient suspension arms which extend in the longitudinal direction of the vehicle on both sides of the vehicle, and which cross the axle body substantially perpendicular, each suspension arm having a curved portion with a concave underside forming an axle recess in which the axle body is received, and each suspension arm being hingedly connectable at the front, viewed in the direction of travel of the vehicle, to a bearing bracket arranged on the vehicle chassis;
- two intermediate members, each intermediate member being positioned in said axle recess between the axle body and the curved portion of one of the respective suspension arms, wherein each intermediate member has a concave underside which matches with the outer contour of the tubular axle body;
- a pneumatic spring for each suspension arm which is operational between the respective suspension arm and the vehicle chassis;
- a clamping assembly associated with each suspension arm, wherein the axle body, the respective intermediate member and the suspension arm are retained solely by the clamping assembly, wherein the shape of the underside of the curved portion of each suspension arm and the corresponding intermediate member are adapted such that there are three arcuate clamp load transferring contact areas between the intermediate member and the suspension arm, or such that there are two arcuate clamp load transferring contact areas between the intermediate member and the suspension arm and one arcuate clamp load transferring contact area between the suspension arm and the axle body, and wherein each arcuate clamp load transferring contact area is located at a respective distinct and predetermined angular location relative to the longitudinal axis of the axle body.

Due to the three arcuate clamp load transferring contact areas being provided at distinct and predetermined angular locations, the clamping angle and thus the spreading of the clamping forces are also predetermined, thereby improving the clamping performance and reducing the chance of undesirable deformation of the axle body.

In an embodiment, the arcuate clamp load transferring contact areas are the only contact areas between the suspension arm and the intermediate member and between the suspension arm and the axle body if applicable.

An advantage of this embodiment is that in between the load transferring contact areas the suspension arm is free to move, e.g. bend and/or twist, without wearing of the suspension arm, intermediate member or axle body at these areas.

Another advantage may be that the fabrication tolerances of the suspension arm and intermediate member are not influencing the clamping behaviour, as a minor difference in shape of the suspension arm and/or the intermediate member will not influence the location of the arcuate clamp load transferring contact areas, so that the desired clamping angle can be guaranteed throughout the range of fabrication tolerances.

In an alternative embodiment, the intermediate member may comprise a relatively soft deformable material to contact the suspension arm in between the load transferring contact areas, i.e. in one or more areas distinct from the arcuate clamp load transferring contact areas. Due to the soft deformable properties of the material, the material is not able to transfer a significant portion of the loads between the suspension arm and the intermediate member, even when fabrication tolerances would result in different load transferring contact areas if said material would be rigid, so that it ensured that despite the contact between the intermediate member and the suspension arm outside the load transferring contact areas, the clamping angle is the desired clamping angle.

In an embodiment, the three distinct and predetermined locations define on the suspension arm side of the axle body a total clamping angle of at least 120 degrees, preferably at least 150 degrees and more preferably of at least 180 degrees, e.g. 200 degrees. This ensures that the clamping forces are spread across a large enough surface of the axle body to minimize the chance of deformation of the axle body.

In an embodiment, at least ½, preferably at least ⅔, and more preferably at least ¾ of the total clamping angle is defined by the intermediate member and two load transferring contact areas, which further aids in spreading the clamping forces across a large surface of the axle body. Preferably, the entire clamping angle is defined by the intermediate member as this provides maximal spreading of the clamping forces.

In an embodiment, each suspension arm comprises recesses on the convex side of the curved portion to receive a part of the clamping assembly. Generally, the centre of a resilient suspension arm in a vehicle axle suspension shows less relative movement than the outer portions of the suspension arm during driving conditions. Due to the recess, the clamping assembly is able to engage with a portion of the suspension arm which has less relative movement than the outer portions of the suspension arm. In other words, the influence of movement of the suspension arm on the clamping assembly is reduced with respect to a suspension arm having no recesses in which the clamping assembly engages with the upper surface of the curved portion of the suspension arm.

Preferably, the shape of the recesses is adapted to fix the position of said part of the clamping assembly during clamping. This results in applying the clamping forces in an efficient manner, but also allows to use two separate clamping bodies on the upper side of the curved portion, i.e. a front clamping body and a separate rear clamping body, wherein each clamping body is fixed in its corresponding recess. In case, the recesses are not able to fix the position of the clamping assembly, a single clamping body, i.e. a front and rear clamping body which are connected to each other, should be used in order to efficiently apply the clamping forces. The single clamping body or the two separate clamping bodies may cooperate with at least one separate third clamping body that engages with the underside of the axle body.

In an embodiment, the at least one third clamping body comprises two U-bolts or straps. In such case, at least one clamping body engages with the suspension arm from above and the U-bolts engage with the axle body from below thereby clamping the suspension arm and the axle body together. The U-bolts each have two ends that are arranged on either the front or the rear side of the axle body. The suspension arm thus preferably has at least one recess at the front side of the curved portion of the suspension arm and at least one recess at the rear side of the curved portion of the suspension arm. More preferably, there are two recesses provided on each front and rear side of the curved portion, i.e. one recess per U-bolt end. The two recesses are preferably provided at both lateral sides of the suspension arm.

In case the clamping assembly comprise U-bolts or straps which extend from the front side of the axle body to the rear side of the axle body to engage with the underside of the axle body, said U-bolts are connectable to clamping bodies arranged on the upper side of the suspension arm, wherein said connections can be tightened to clamp the suspension arm, intermediate member and axle body together. In other words, the U-bolts are tensionable with respect to the clamping bodies arranged on the upper side of the suspension arm.

In an embodiment, the recesses extend to about half way the thickness of the suspension arm, such that a part of the clamping assembly engages with the suspension arm at or near the neutral surface of the suspension arm, said neutral surface being defined as the plane which has zero normal stress when the suspension arm is only subjected to bending about an axis parallel to the longitudinal axis of the axle body.

The neutral surface of the suspension arm is the location where the movement of the suspension arm due to bending is minimal. By providing the engagement between the suspension arm and the part of the clamping assembly at or near the neutral surface, the influence of the movement on the clamping is minimized.

In an embodiment, a form locking engagement is provided at one angular location between the axle body and the suspension arm to prevent the axle body from rotating relative to the suspension arm about the longitudinal axis of the axle body.

In an embodiment, the intermediate member comprises two protrusions and the suspension arm and axle body each comprise a complementary recess or indent to receive said corresponding protrusion in order to form the form locking engagement between suspension arm and axle body. Preferably, the form locking engagement is provided at the upperside of the axle body in between the other two locations.

Preferably, the protrusions have, in cross section, a rounded shape, e.g. a circle segment shape.

In an embodiment, a damper is provided between the vehicle chassis, e.g. via the bearing bracket, and the suspension arm or the clamping assembly.

In an embodiment, the resilient suspension arms are fabricated using forging as described in WO2009/014423.

The invention also relates to a vehicle comprising one or more vehicle axle suspensions according to the invention.

The invention will now be described with reference to the accompanying drawings in which like parts are designated with like reference numerals and in which.

Figure 1:
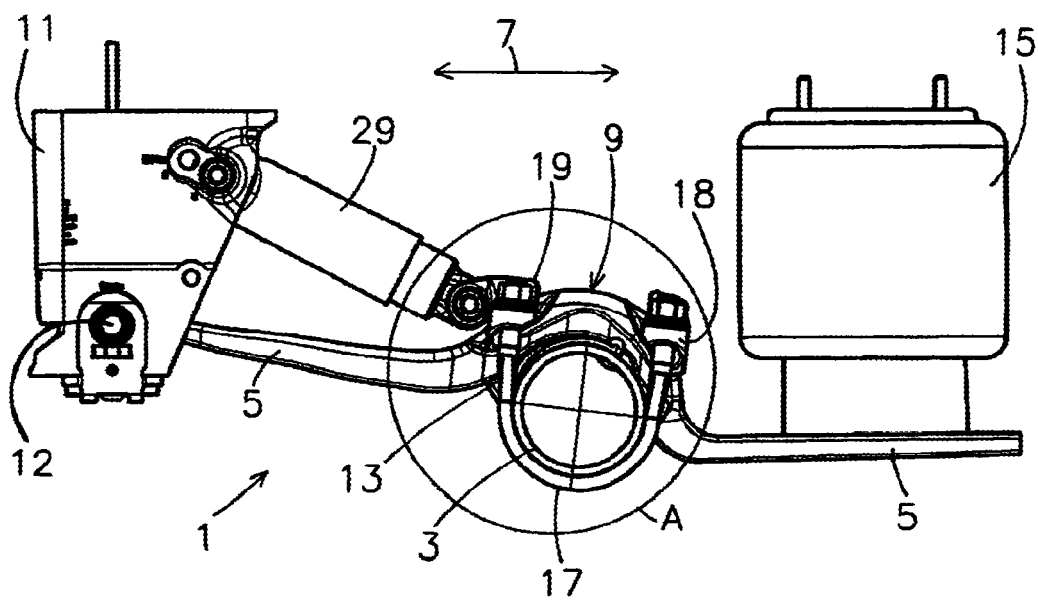
FIG. 1 depicts in side view a vehicle axle suspension according to an embodiment of the invention.

FIG. 1 depicts a vehicle axle suspension 1 for a vehicle (not shown) according to an embodiment of the invention. The vehicle axle suspension 1 comprises a tubular axle body 3 to which wheels can be attached on both sides of the axle body 3. The axle body 3 is mounted to a vehicle by resilient suspension arms 5 which extend in the longitudinal direction 7 of the vehicle on both sides of the vehicle. In the side view of FIG. 1 only one suspension arm 5 is depicted.

Preferably, the axle body 3 has a circular cross section, such that the axle body is a cylindrical element.

The suspension arm 5 crosses the axle body 3 substantially perpendicular. At the location of the axle body 3, the suspension arm has a curved portion 9, wherein the axle body 3 is arranged on the concave underside of the curved portion 9 of the suspension arm 5, i.e. the axle body is received in a axle recess formed by the concave underside of the curved portion. The suspension arm 5 is hingedly connected to a bearing bracket 11 arranged on the vehicle chassis at the front of the suspension arm seen in the direction of travel of the vehicle which in this figure is to the left. The suspension arm 5 is thus able to hinge about hinge axis 12.

Each suspension arm 5 is provided with a pneumatic spring 15 which is operational between the respective suspension arm 5 and the vehicle chassis. In this embodiment, the pneumatic spring 15 is provided at the rear side of the suspension arm seen in the direction of travel of the vehicle.

A clamping assembly 17, 18, 19 associated with each suspension arm is provided to retain the axle body and the suspension arm by clamping.

In this embodiment, the clamping assembly comprises two clamping bodies 18,19, one clamping body 19 being provided at the front side of the axle body and the other clamping body 18 being provided at the rear side of the axle body, and two U-bolts 17 (of which only one can be seen in FIG. 1) which extend from the front side of the axle body to the rear side of the axle body via the underside of the axle body. The two ends of the U-bolts are provided with a thread and with a nut 30. By tightening the nuts, clamping forces can be applied to the suspension arm and axle body. Both clamping bodies engage with the suspension arm at the upperside of the curved portion of the suspension arm, while the U-bolts engage with the underside of the axle body.

As is preferred, a damper 29 is arranged between the clamping body 19 and the bearing bracket 11 to dampen movement of the axle body during driving.

Figure 2:
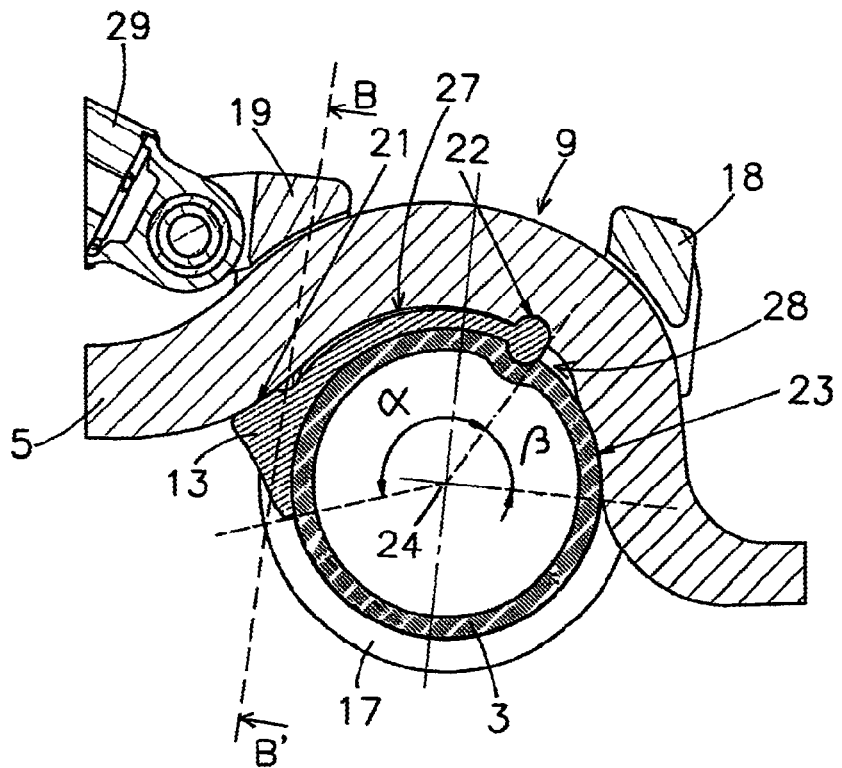
FIG. 2 depicts a cross section of a portion of the vehicle axle suspension of FIG. 1.

FIG. 2 depicts a cross section of a portion A of the vehicle axle suspension of FIG. 1. Shown are the suspension arm 5, the axle body 3, the U-bolt 17, and clamping bodies 18 and 19. As can be clearly seen in FIG. 2, the vehicle axle suspension comprises an intermediate member 13 arranged between the axle body 3 and the curved portion 9 of the suspension arm, wherein each intermediate member has a concave underside which matches with the outer contour of the tubular axle body. The matching shape has the advantage that forces applied appropriately to the intermediate member may be spread across most, preferably the entire engaging surface between intermediate member 13 and axle body 3.

Preferably, the intermediate member is made of metal, e.g. steel and fabricated using casting.

The shape of the underside of the curved portion of the suspension arm and the intermediate member is such that there are two arcuate clamp load transferring contact areas 21,22 between the intermediate member 13 and the suspension arm 5 and one arcuate clamp load transferring contact area 23 between the suspension arm 5 and the axle body 3 at three respective distinct and predetermined angular locations relative to the longitudinal axis 24 of the axle body.

As a result, the axle body 3 is clamped by the underside of the curved portion 9 of the suspension arm 5 over a clamping angle which extends from the load transferring contact area 21 to the load transferring contact area 23 via the load transferring contact area 22. Because the locations are predetermined, the clamping angle can be set to be sufficient to spread the clamping forces across a substantially angular area of the axle body thereby minimizing the deformation due to these clamping forces. The total clamping angle is partially defined by the intermediate member as shown by angle α. An additional clamping angle β is defined by the load transferring contact area 23 between suspension arm and the axle body. In this embodiment, the total clamping angle (α+β) is more than 180 degrees, more precisely, the clamping angle in this embodiment is about 200 degrees.

In this embodiment, the locations of the load transferring areas are predetermined by leaving an empty space 27 between the intermediate member 13 and the suspension arm 5 between load transferring contact areas 21 and 22, and an empty space 28 between the suspension arm 5 and the axle body 3 between load transferring contact areas 22 and 23. This has the additional advantage that fabrication tolerances do not affect the location of the load transferring contact areas.

In an alternative embodiment, one or more of the empty spaces 27 and 28 may be filled with soft deformable material which may be attached to the intermediate member and contact the suspension arm. Although this may lead to additional contact areas, the soft and deformable properties ensure that only the contact areas 21, 22, 23 are able to substantially transfer loads from the suspension arm 5 to the intermediate member 13 or the axle body 3.

At the angular location of the load transferring contact area 21, a form locking engagement between axle body 3 and the suspension arm 5 is provided, here via the intermediate member 13, but it will be understood by a skilled person that the form locking engagement may also be provided at the other angular locations and can also be applied directly between suspension arm 5 and axle body 3. The form locking engagement is here formed by two protrusions of the intermediate member 13 that are received in corresponding recesses or indents of the suspension arm 5 and axle body 3. As a result, the form locking engagement is able to prevent rotation of the axle body 3 relative to the suspension arm 5 about the longitudinal axis 24 of the axle body.

Figure 3:
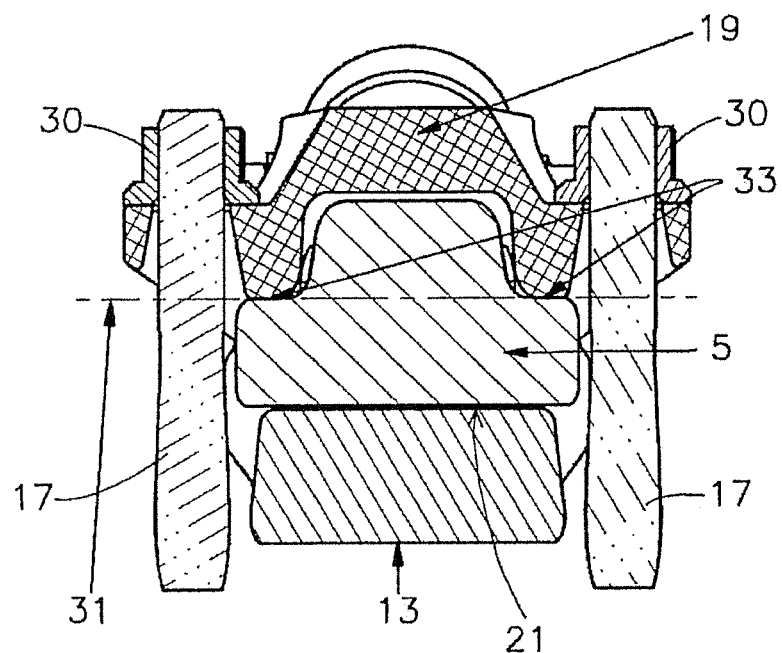
FIG. 3 depicts another cross section of a portion of the vehicle axle suspension of FIG. 1.

FIG. 3 depicts a cross section B-B' (see FIG. 2) of a portion of the vehicle axle suspension of FIG. 1 and shows in more detail the load transferring contact area 21 and the clamping action of clamping body 19.

FIG. 3 shows the suspension arm 5 and the intermediate member 13. The suspension arm 5 makes contact with the intermediate member 13 at load transferring contact area 21. The intermediate member 13 in turn contacts the axle body (not shown in FIG. 3). To clamp the suspension arm 5, intermediate member 13 and the axle body 3 together, two U-bolts 17 are provided on each side of the suspension arm 5. In FIG. 3 only one end of each U-bolt 17 is shown. The ends of the U-bolts extend through the clamping body 19, comprise threads and are provided with nuts 30. By tightening the nuts, the distance between the U-bolts 17 and the clamping body 19 tends to reduce thereby applying a clamping force.

The main part of the suspension arm 5 has a mainly rectangular cross section. In the region of the clamping body however, the suspension arm comprises two recesses, one on each lateral side of the suspension arm, as can be clearly seen in FIG. 3. In this embodiment, the recesses extend in a vertical direction to about half way the suspension arm's thickness. Because of this, the upper half of the cross section of the suspension arm has a smaller thickness than the lower half of the cross section of the suspension arm.

The recesses each define a surface 33 parallel to the top and lower surface of the suspension arm 5 where the clamping body 19 is able to engage with said suspension arm 5. Said surface 33 is located at or near a neutral surface 31 which is defined as the surface with zero normal stress when the suspension arm is only subjected to bending about an axis parallel to the longitudinal axis of the axle body. As the normal stresses are zero or almost zero at this location, movement of the suspension arm due to bending will also be minimal there, so that the clamping action of the clamping body and U-bolts, i.e. the clamping assembly, is minimally influenced by the movement of the suspension arm during driving.

The clamping body 19 may have a recess to receive the upper portion of the suspension arm 5 in order to allow the clamping body 19 to contact the suspension arm 5 at the surfaces 33 without contacting the top surface of the suspension arm 5.

Figure 4:
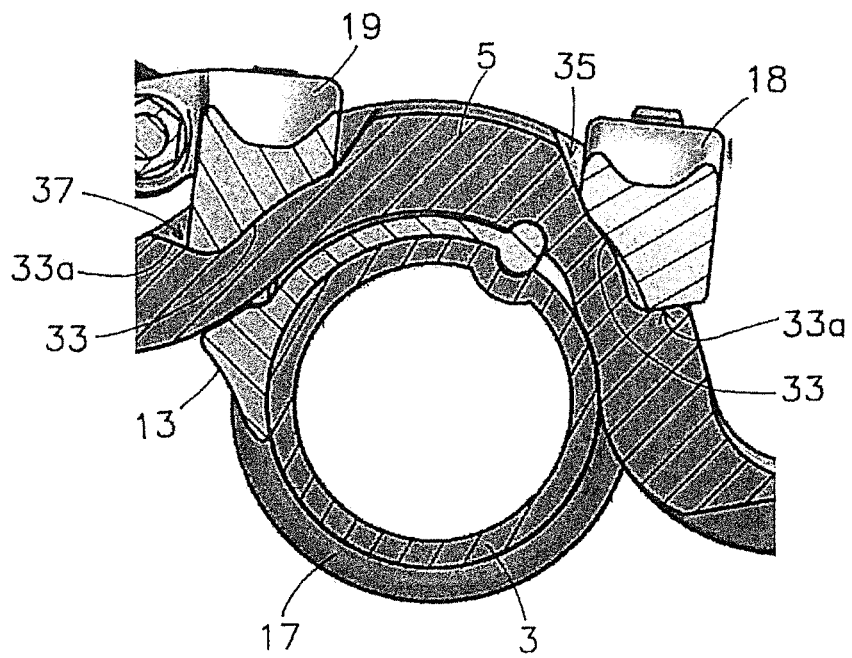
FIG. 4 depicts yet another cross section of a portion of the vehicle axle suspension of FIG. 1.

FIG. 4 depicts a cross section of a portion of the vehicle axle suspension 1 of FIG. 1. The difference between the cross sections of FIG. 2 and FIG. 4 is that the cross section of FIG. 2 is the intersection of portion A of FIG. 1 with a vertical plane extending through the centre of the suspension arm, whereas the cross section of FIG. 4 is the intersection of portion A of FIG. 1 with a vertical plane extending through a recess in the suspension arm 5.

The suspension arm 5 comprises two recesses per clamping body, as shown with reference to FIG. 3, of which only one 35,37 per respective clamping body 18,19 is shown in FIG. 4. The shape of the recesses 35,37 is such that during clamping the position of the clamping bodies 18,19 is fixed relative to the suspension arm 5. The engagement surface 33 of the recesses therefore comprises an abutment portion 33a against which the clamping bodies may come to rest during clamping.

Figure 5:
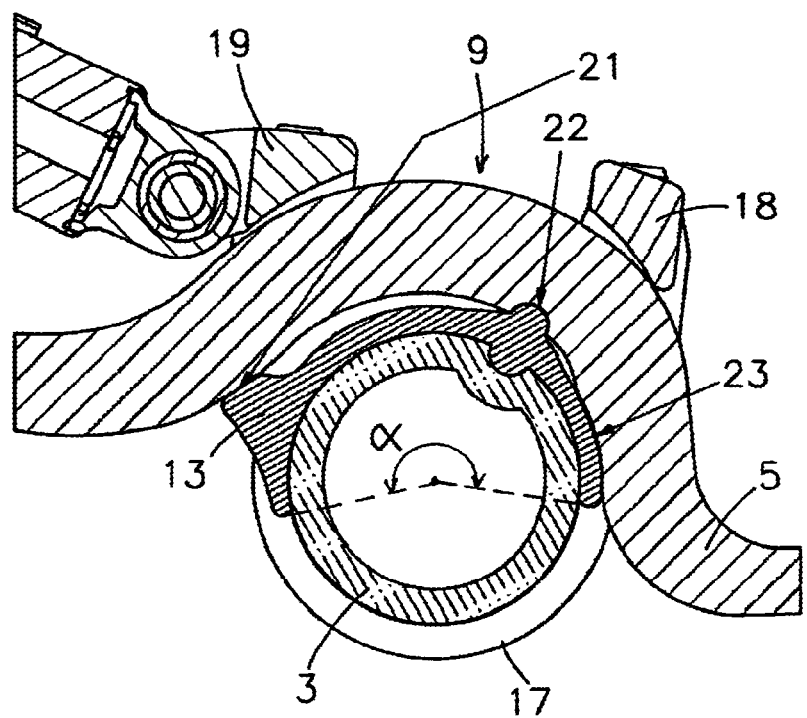
FIG. 5 depicts a cross section of a portion of a vehicle axle suspension according to another embodiment of the invention.

FIG. 5 depicts a cross section of a portion of a vehicle axle suspension according to another embodiment of the invention. The difference between the embodiment of FIG. 2 is that the shape of the underside of the curved portion 9 of each suspension arm 5 and the corresponding intermediate member 13 are adapted such that there are three load transferring contact areas 21-23 between the intermediate member 13 and the suspension arm 5 at three respective distinct and predetermined angular locations relative to the longitudinal axis 24 of the axle body 3. There is thus no direct contact between axle body 3 and suspension arm 5.

As can be seen by comparing the embodiments of FIGS. 2 and 4, it is possible to clamp two different axle bodies 3 to the same suspension arm 5 by changing between intermediate members 13. For a relatively large diameter axle body 3, the intermediate member 13 is small and one of the load transferring contact areas 23 is between the suspension arm 5 and the axle body 3, whereas for a relatively small diameter axle body 3, a larger intermediate member 13 can be used thereby having no direct contact between the axle body 3 and the suspension arm 5, but still having the advantage of three predetermined load transferring contact areas 21-23 which allow a desired total clamping angle α.

The difference between the embodiments of FIGS. 2 and 4 is thus also that the total clamping angle α determined by the intermediate member 13 alone and there is no additional clamping angle β. In the embodiment of FIG. 2, this angle α is about 140 degrees, whereas in FIG. 4 this angle α is about 200 degrees. In principle, it is preferred that the clamping angle α defined by the intermediate member is as large as possible to aid in spreading the clamping forces and avoid to apply high local clamping forces to the axle body 3.

It is explicitly mentioned here that in the shown embodiments, the suspension arm, the intermediate member and the axle body are retained solely by clamping forces applied by the clamping assembly. There is no additional fixation such as welding performed to attach elements to each other.

The invention claimed is:

1. A vehicle axle suspension of a vehicle, comprising:
    an axle body;
    a resilient suspension arm extending in a longitudinal direction of the vehicle and crossing the axle body substantially perpendicular, the suspension arm having an axle seating portion receiving the axle body;
    a bearing bracket arranged on a vehicle chassis, wherein the suspension arm is hingedly connected at a front portion, viewed in a direction of travel of the vehicle, to the bearing bracket;
    a pneumatic spring being operational between the suspension arm and the vehicle chassis;
    at least one clamping assembly clamping the axle body and a trailing portion of the suspension arm together at the axle seating portion, the clamping assembly comprising a U-bolt extending around an underside of the axle body and a clamping body located at an upper side of the axle seating portion of the suspension arm, the clamping body extending in a transverse direction over an upper side of the suspension arm, the clamping body having on either side a lateral portion provided with a bore for passing through an upwardly extending leg of the U-bolt, the clamping body further comprising a connecting portion interconnecting the lateral portions of the clamping body,
    wherein the suspension arm has at either lateral side an engagement surface, providing a support surface for the lateral portions of the clamping body, wherein the clamping body is only supported at the lateral portions.

2. The vehicle axle suspension according to claim 1, wherein the engagement surfaces are located in a neutral plane of the suspension arm, the neutral plane of the suspension arm being the location where the movement of the suspension arm due to bending about an axis parallel to a longitudinal axis of the axle body is minimal.

3. An assembly comprising: a resilient suspension arm for a vehicle axle suspension of a vehicle, the suspension arm extending in use in a longitudinal direction of the vehicle and comprising an axle seating portion at which an axle can be arranged, wherein the suspension arm has at the axle seating portion at either lateral side an engagement surface providing a support surface for lateral portions of a clamping body that in use extends over an upper side of the suspension arm, the clamping body to be provided at the axle seating portion of the suspension arm, which clamping body extends in a mounted state in a transverse direction over an upper side of the suspension arm, the clamping body having on either side a lateral portion provided with a bore for passing through an upwardly extending leg of a U-bolt, the clamping body further comprising a connecting portion interconnecting the lateral portions of the clamping body, wherein in the mounted state there is a gap between an upper side of a trailing portion of the suspension arm and the connecting portion of the clamping body extending over it, and wherein the clamping body is only supported at the lateral portions.

4. The assembly according to claim 3, wherein each of the engagement surfaces is located in a recessed area formed in an upper side of a trailing portion of the suspension arm.

5. The assembly according to claim 3, wherein the support surfaces lie in a neutral plane of the suspension arm, the neutral plane of the suspension arm being the location where the movement of the suspension arm due to bending about an axis parallel to the longitudinal axis of the axle body is minimal.

6. The assembly according to claim 3, wherein the axle seating portion is a curved portion.

* * * * *